United States Patent
Lv et al.

(10) Patent No.: US 11,805,238 B2
(45) Date of Patent: Oct. 31, 2023

(54) METHODS AND APPARATUSES FOR ACQUIRING DISPLAY IMAGE SEQUENCE, ROTARY STEREOSCOPIC DISPLAY DEVICES AND STORAGE MEDIA

(71) Applicants: Beijing BOE Optoelectronics Technology Co., Ltd., Beijing (CN); BOE Technology Group Co., Ltd., Beijing (CN)

(72) Inventors: Yaoyu Lv, Beijing (CN); Yachong Xue, Beijing (CN); Zhanshan Ma, Beijing (CN); Jiankang Sun, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 269 days.

(21) Appl. No.: 17/462,894

(22) Filed: Aug. 31, 2021

(65) Prior Publication Data
US 2022/0094905 A1    Mar. 24, 2022

(30) Foreign Application Priority Data
Sep. 23, 2020   (CN) .......................... 202011009979.0

(51) Int. Cl.
*H04N 13/393* (2018.01)
*G06F 17/10* (2006.01)
*H04N 13/106* (2018.01)

(52) U.S. Cl.
CPC ........... *H04N 13/393* (2018.05); *G06F 17/10* (2013.01); *H04N 13/106* (2018.05)

(58) Field of Classification Search
CPC ....... G06F 17/10; G06F 17/18; H04N 13/106; H04N 13/393
(Continued)

(56) References Cited

U.S. PATENT DOCUMENTS

| 6,765,566 B1* | 7/2004 | Tsao | ...................... H04N 13/363 353/7 |
| 7,477,252 B2* | 1/2009 | Chun | ................... H04N 13/393 348/E13.056 |

(Continued)

FOREIGN PATENT DOCUMENTS

CN    101042775 A   *   9/2007

OTHER PUBLICATIONS

Lin et al, 2005: Yuanfang Lin, Xu Liu, Yi Yao, Xiaojie Zhang, Xiangdong Liu, Fengchun Lin, "Key factors in the design of a LED volumetric 3D display system," Proc. SPIE 5632, Light-Emitting Diode Materials and Devices, (Jan. 12, 2005); doi: 10.1117/12.574165 (Year: 2005).*

(Continued)

*Primary Examiner* — Christopher S Kelley
*Assistant Examiner* — Ana Picon-Feliciano
(74) *Attorney, Agent, or Firm* — IPRO, PLLC

(57) ABSTRACT

Methods and apparatuses for acquiring display image sequence, rotary stereoscopic display devices and storage media are provided. A method includes: determining voxels in a 3D display space by multiple partitioning of the 3D display space in a cylindrical coordinate system using a predetermined partitioning mode, where the predetermined partitioning mode includes non-uniform partitioning in a radius direction of the cylindrical coordinate system, and space bounding boxes resulting from a same partitioning have a same volume; determining a cross-sectional profile of a 3D object to be displayed on a display screen at each of
(Continued)

phase positions; determining a cross-sectional image based on voxels and the cross-sectional profile at each of the phase positions; and acquiring a display image sequence by arranging the cross-sectional images according to rotation angles of the display screen.

17 Claims, 4 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 2002/0140631 | A1* | 10/2002 | Blundell | ................ G09G 3/005 |
| | | | | 348/E13.056 |
| 2005/0035962 | A1* | 2/2005 | Ishibashi | ................ G09G 3/003 |
| | | | | 345/110 |
| 2013/0100126 | A1* | 4/2013 | Kim | ..................... H04N 13/393 |
| | | | | 345/419 |

OTHER PUBLICATIONS

Lin Y(Machine translation of CN 101042775 A) (Year: 2007).*

* cited by examiner

METHODS AND APPARATUSES FOR ACQUIRING DISPLAY IMAGE SEQUENCE, ROTARY STEREOSCOPIC DISPLAY DEVICES AND STORAGE MEDIA

CROSS-REFERENCE TO RELATED APPLICATIONS

The present disclosure claims a priority to Chinese patent application No. 202011009979.0 filed on Sep. 23, 2020 and entitled "METHODS AND APPARATUSES FOR ACQUIRING DISPLAY IMAGE SEQUENCE, ELECTRONIC DEVICES AND STORAGE MEDIA", which is incorporated herein by reference in its entirety.

TECHNICAL FIELD

The present disclosure relates to the field of display control technology, and in particular to a method and apparatus for acquiring a display image sequence, a rotary stereoscopic display device, and a storage medium.

BACKGROUND

A rotary stereoscopic display device belongs to the field of three-dimensional (3D) display, and may be implemented by rotating a screen around a fixed shaft at high speed and displaying different images at different rotation angles, to achieve a real 3D display effect using a persistence of vision effect of human eyes. The following definitions are provided in conjunction with FIG. 1.

One rotation of the screen means that the device has refreshed one body frame.

A number of display positions selected from one body frame are called phase positions.

During rotation of the screen, display images are refreshed at the phase positions, which is called electronic frame.

On the whole, an actual spatial position of a pixel of the screen at each of the phase positions is called a voxel.

In the related art, it is necessary for the rotary stereoscopic display device to partition and compress a 3D display space during a display process, such that an overall distribution of voxels is strictly uniform.

SUMMARY

Embodiments of the present disclosure provide a method and apparatus for acquiring a display image sequence, a rotary stereoscopic display device, and a storage medium.

According to a first aspect of embodiments of the present disclosure, there is provided a method of acquiring a display image sequence, which is applicable to a rotary stereoscopic display device, the rotary stereoscopic display device including a display screen and a rotating shaft around which the display screen rotates to form a 3D display space, and the display screen having a plurality of phase positions for display in the 3D display space, the method including:

determining voxels in the 3D display space by multiple partitioning of the 3D display space in a cylindrical coordinate system using a predetermined partitioning mode, where the predetermined partitioning mode includes non-uniform partitioning in a radius direction of the cylindrical coordinate system, and space bounding boxes resulting from a same partitioning have a same volume, and a voxel indicates an actual spatial position of a pixel of the display screen at each of the phase positions;

determining a cross-sectional profile of a 3D object to be displayed on the display screen at each of the phase positions;

determining a cross-sectional image based on voxels and the cross-sectional profile at each of the phase positions; and acquiring a display image sequence by arranging the cross-sectional images according to rotation angles of the display screen.

Optionally, the predetermined partitioning mode further includes uniform partitioning in a direction of the rotating shaft and a direction of rotation of the cylindrical coordinate system.

Optionally, determining the voxels in the 3D display space by multiple partitioning of the 3D display space in the cylindrical coordinate system using the predetermined partitioning mode includes:

performing an octree partitioning on the 3D display space using the predetermined partitioning mode, and obtaining leaf node space bounding boxes resulting from a current partitioning when a number of voxels in leaf node space bounding boxes resulting from a next partitioning of the current partitioning is zero; and compressing a number of voxels in each of the leaf node space bounding boxes such that the number of the voxels in each of the leaf node space bounding boxes lies within a predetermined range to obtain the voxels in the 3D display space.

Optionally, after the multiple partitioning of the 3D display space in the cylindrical coordinate system using the predetermined partitioning mode, the method further includes:

obtaining a current number and a default number of the voxels in each of the leaf node space bounding boxes for the 3D object to be displayed, where the current number indicates a number of corresponding voxels when displaying the 3D object, and the default number indicates a number of voxels determined by partitioning of the 3D display space using the predetermined partitioning mode; and in response to the current number being less than or equal to the default number, retaining the current number of voxels in each of the leaf node space bounding boxes, and in response to the current number being greater than the default number, adjusting the number of the voxels in each of the leaf node space bounding boxes based on a predetermined adjustment algorithm such that an adjusted number of voxels is greater than or equal to the default number and less than or equal to the current number.

Optionally, the adjustment algorithm is obtained by operations including:

obtaining voxel samples by normalizing the voxels in each of the leaf node space bounding boxes;

obtaining a probability density distribution of the voxel samples in each of direction dimensions of the cylindrical coordinate system; and obtaining the adjustment algorithm based on a predetermined confidence level and the probability density distribution in each direction dimension.

Optionally, obtaining the voxel samples by normalizing the voxels in each of the leaf node space bounding boxes includes:

obtaining a mean value of voxel data of the voxels in each direction dimension;

obtaining difference data of each voxel in each direction dimension by subtracting the mean value of the voxel data of the voxels in each direction dimension from voxel data of each voxel; and obtaining the voxel samples by calculating and normalizing a second order matrix of the voxel data of each voxel.

Optionally, obtaining the probability density distribution of the voxel samples in each of direction dimensions of the cylindrical coordinate system includes:

dividing the 3D display space into a plurality of intervals by using a leaf node space bounding box as a partitioning threshold in the radius direction, a direction of rotation and a direction of the rotating shaft, respectively;

obtaining statistical histograms by counting a number of voxel samples in each of the intervals in the radius direction, the direction of rotation and the direction of the rotating shaft, respectively; and obtaining a target polynomial in each direction dimension by fitting the statistical histograms using a least square method, and using the target polynomial in each direction dimension as the probability density distribution of the voxel samples in each direction dimension.

Optionally, the adjustment algorithm is expressed as:

$$v = v_{tree} + (\alpha f(r) + \beta f(\theta) + \gamma f(z)) \cdot \mathrm{Con}(r) \cdot (v - v_{tree}),$$

where, $v_{tree}$ denotes the default number, v denotes the current number, $f(r)$ denotes the probability density distribution in the radius direction, $f(\theta)$ denotes the probability density distribution in a direction of rotation, and $f(z)$ denotes the probability density distribution in a direction of the rotating shaft, $\alpha$, $\beta$ and $\gamma$ denote weights of $f(r)$, $f(\theta)$ and $f(z)$, respectively, and $\mathrm{Con}(r)$ denotes the confidence level, $\lim_{r \to 0} \mathrm{Con}(r) = 0$ and $\lim_{r \to R} \mathrm{Con}(r) = 1$.

According to a second aspect of embodiments of the present disclosure, there is provided a rotary stereoscopic display device, the rotary stereoscopic display device including a display screen and a rotating shaft around which the display screen rotates to form a 3D display space, and the display screen having a plurality of phase positions for display in the 3D display space, the rotary stereoscopic display device further including:

a processor; and a memory configured to store a computer program executable by the processor, where the processor is configured to execute the computer program in the memory to perform operations including:

determining voxels in the 3D display space by multiple partitioning of the 3D display space in a cylindrical coordinate system using a predetermined partitioning mode, where the predetermined partitioning mode includes non-uniform partitioning in a radius direction of the cylindrical coordinate system, and space bounding boxes resulting from a same partitioning have a same volume, and a voxel indicates an actual spatial position of a pixel of the display screen at each of the phase positions;

determining a cross-sectional profile of a 3D object to be displayed on the display screen at each of the phase positions;

determining a cross-sectional image based on voxels and the cross-sectional profile at each of the phase positions; and acquiring a display image sequence by arranging the cross-sectional images according to rotation angles of the display screen.

Optionally, the predetermined partitioning mode further includes uniform partitioning in a direction of the rotating shaft and a direction of rotation of the cylindrical coordinate system.

Optionally, determining the voxels in the 3D display space by multiple partitioning of the 3D display space in the cylindrical coordinate system using the predetermined partitioning mode includes:

performing an octree partitioning on the 3D display space using the predetermined partitioning mode, and obtaining leaf node space bounding boxes resulting from a current partitioning when a number of voxels in leaf node space bounding boxes resulting from a next partitioning of the current partitioning is zero; and compressing a number of voxels in each of the leaf node space bounding boxes such that the number of the voxels in each of the leaf node space bounding boxes lies within a predetermined range to obtain the voxels in the 3D display space.

Optionally, after the multiple partitioning of the 3D display space in the cylindrical coordinate system using the predetermined partitioning mode, the method further includes:

obtaining a current number and a default number of the voxels in each of the leaf node space bounding boxes for the 3D object to be displayed, where the current number indicates a number of corresponding voxels when displaying the 3D object, and the default number indicates a number of voxels determined by partitioning of the 3D display space using the predetermined partitioning mode; and in response to the current number being less than or equal to the default number, retaining the current number of voxels in each of the leaf node space bounding boxes, and in response to the current number being greater than the default number, adjusting the number of the voxels in each of the leaf node space bounding boxes based on a predetermined adjustment algorithm such that an adjusted number of voxels is greater than or equal to the default number and less than or equal to the current number.

Optionally, the adjustment algorithm is obtained by operations including:

obtaining voxel samples by normalizing the voxels in each of the leaf node space bounding boxes;

obtaining a probability density distribution of the voxel samples in each of direction dimensions of the cylindrical coordinate system; and obtaining the adjustment algorithm based on a predetermined confidence level and the probability density distribution in each direction dimension.

Optionally, obtaining the voxel samples by normalizing the voxels in each of the leaf node space bounding boxes includes:

obtaining a mean value of voxel data of the voxels in each direction dimension;

obtaining difference data of each voxel in each direction dimension by subtracting the mean value of the voxel data of the voxels in each direction dimension from voxel data of each voxel; and obtaining the voxel samples by calculating and normalizing a second order matrix of the voxel data of each voxel.

Optionally, obtaining the probability density distribution of the voxel samples in each of direction dimensions of the cylindrical coordinate system includes:

dividing the 3D display space into a plurality of intervals by using a leaf node space bounding box as a partitioning threshold in the radius direction, a direction of rotation and a direction of the rotating shaft, respectively;

obtaining statistical histograms by counting a number of voxel samples in each of the intervals in the radius direction, the direction of rotation and the direction of the rotating shaft, respectively; and obtaining a target polynomial in each direction dimension by fitting the statistical histograms using a least square method, and using the target polynomial in each direction dimension as the probability density distribution of the voxel samples in each direction dimension.

Optionally, the adjustment algorithm is expressed as:

$$v'=v_{tree}+(\alpha f(r)+\beta f(\theta)+\gamma f(z))\cdot Con(r)\cdot(v-v_{tree}),$$

where, $v_{tree}$ denotes the default number, v denotes the current number, f(r) denotes the probability density distribution in the radius direction, f(θ) denotes the probability density distribution in a direction of rotation, and f(z) denotes the probability density distribution in a direction of the rotating shall, α, β and γ denote weights of f(r), f(θ) and f(z), respectively, and Con(r) denotes the confidence level, $\lim_{r\to 0} Con(r)=0$ and $\lim_{r\to R} Con(r)=1$.

According to a third aspect of embodiments of the present disclosure, there is provided a computer-readable storage medium including an executable computer program, which, when executed by a processor, causes the processor to perform the above method.

It should be understood that the above general description and the following detailed description are merely exemplary and explanatory, and are not intended to limit the present disclosure.

BRIEF DESCRIPTION OF DRAWINGS

The drawings herein, which are incorporated into the specification and constitute a part of the specification, illustrate embodiments in accordance with the present disclosure, and are used together with the specification to explain the principle of the present disclosure.

DETAILED DESCRIPTION

Figure 1:
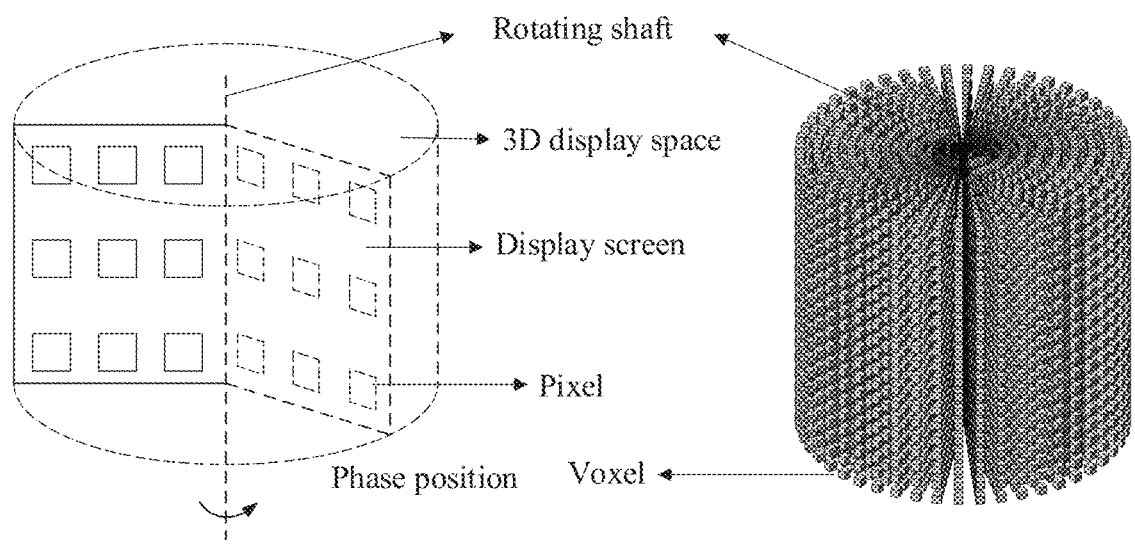
FIG. 1 is a schematic diagram illustrating a rotary stereoscopic display device.

Exemplary embodiments will be described in detail herein, and examples thereof are illustrated in the drawings. When the following description refers to the drawings, the same numbers in different drawings indicate the same or similar elements, unless otherwise indicated. Implementations described in the following exemplary embodiments do not represent all implementations in accordance with the present disclosure. Rather, they are merely examples of methods and apparatuses in accordance with some aspects of the present disclosure as detailed in the appended claims.

Referring to FIG. 1, a 3D display principle of a rotary stereoscopic display device is illustrated. As can be seen from FIG. 1, pixels on a screen close to a rotating shaft have a smaller perimeter to turn, and pixels on the screen far from the rotating shaft have a larger perimeter to turn. Therefore, an overall display effect is as follows: voxels at the rotating shaft are densely distributed and the display brightness is high, and voxels at an edge are sparsely distributed and the display brightness is low.

Figure 2:
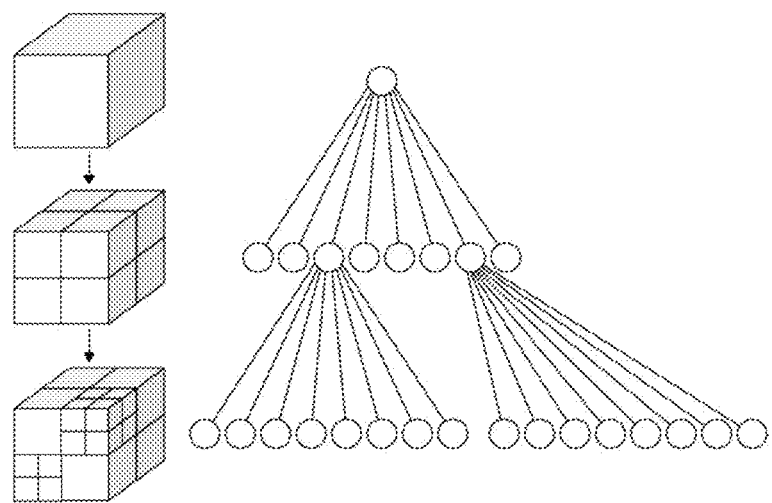
FIG. 2 is a schematic diagram of nodes in an octree partitioning of a 3D display space using cubes in the related art.

In order to make an overall distribution of the voxels uniform and improve the overall display effect, the voxels are uniformized by using an octree point cloud compression algorithm in the related art. Referring to FIG. 2, a cube space bounding box is established as a root node, which is divided hierarchically into the smallest cube bounding boxes as leaf nodes. The same number of voxels are retained in each of the leaf node bounding boxes to make the overall distribution of the voxels strictly uniform.

However, the octree point cloud compression algorithm in the related art has the following disadvantages: (i) the distribution of the voxels is a cylinder instead of a cube, and a curved edge of the cylinder is approximated by cube bounding boxes, resulting in poor applicability; and (ii) the number of voxels retained in each leaf node is strictly the same, which makes the overall distribution of the voxels uniform but loses a large amount of model contour details, resulting in loss of detail information and poor overall display effect.

Figure 3:
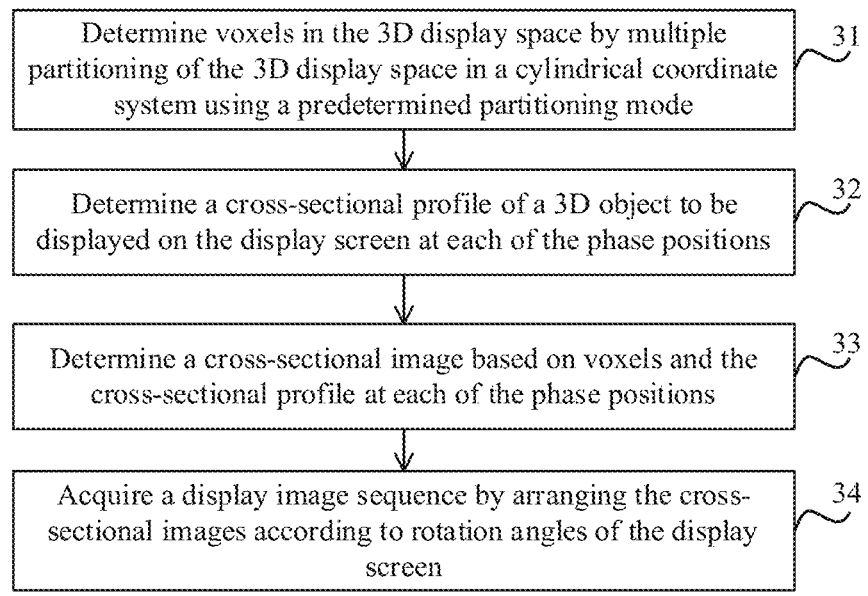
FIG. 3 is a flowchart illustrating a method of acquiring a display image sequence according to an exemplary embodiment.

Embodiments of the present disclosure provide a method of acquiring a display image sequence, which is applicable to a rotary stereoscopic display device. Referring to FIG. 1, the rotary stereoscopic display device includes a display screen and a rotating shaft around which the display screen rotates to form a 3D display space, and the display screen has a plurality of phase positions for display in the 3D display space. FIG. 3 is a flowchart illustrating a method of acquiring a display image sequence according to an exemplary embodiment. Referring to FIG. 3, the method includes steps 31 to 34.

At step 31, voxels in the 3D display space are determined by multiple partitioning of the 3D display space in a cylindrical coordinate system using a predetermined partitioning mode. The predetermined partitioning mode includes non-uniform partitioning in a radius direction of the cylindrical coordinate system, and space bounding boxes resulting from a same partitioning have a same volume, and a voxel indicates an actual spatial position of a pixel of the display screen at each of the phase positions.

A processor in the rotary stereoscopic display device may acquire the 3D display space and then determine the voxels in the 3D display space, i.e., determine actual spatial positions of pixels of the display screen at each phase position, or actual spatial positions of pixels available in the display screen at each phase position.

Figure 4:
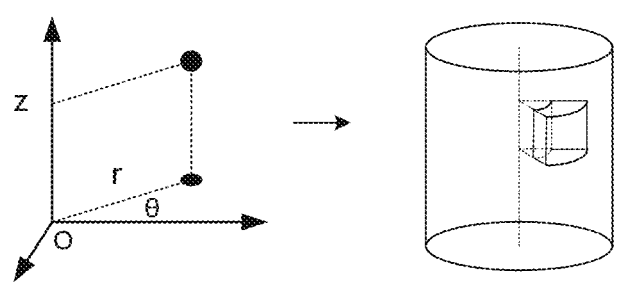
FIG. 4 is a schematic diagram illustrating a space bounding box according to an exemplary embodiment.

Considering that the 3D display space is a cylinder, the processor may first establish a cylindrical coordinate system. Referring to FIG. 4, the cylindrical coordinate system (r, θ, z) may be obtained by taking a vertex of a bezel around which the display screen rotates as the origin O, a direction of the bezel around which the display screen rotates, i.e., a direction of the rotating shaft, as Z-axis, a direction perpendicular to the rotating shaft as the radius direction, and a direction of rotation around the Z-axis as a direction of rotation, as shown on the left in FIG. 4. In addition, during the subsequent partitioning process, a space hounding box for each node may be expressed as $r_{min}$, $r_{max}$, $\theta_{min}$, $\theta_{max}$, $z_{min}$, $z_{max}$), as shown on the right in FIG. 4.

The processor may performing an octree partitioning on the 3D display space using the predetermined partitioning mode, as shown on the right in FIG. 2, which includes the following operations.

(A) For the root node, it may be expressed as (0, R, 0, 2π, 0, Z).

(B) For the first-level nodes (8 nodes obtained after the octree partitioning of the root node), space hounding boxes for the 8 nodes may be expressed as follows:

$$\left(0, \sqrt{\frac{R^2}{2}}, 0, \pi, 0, \frac{Z}{2}\right), \left(0, \sqrt{\frac{R^2}{2}}, 0, \pi, \frac{Z}{2}, Z\right),$$

$$\left(0, \sqrt{\frac{R^2}{2}}, \pi, 2\pi, 0, \frac{Z}{2}\right), \left(0, \sqrt{\frac{R^2}{2}}, \pi, 2\pi, \frac{Z}{2}, Z\right),$$

$$\left(\sqrt{\frac{R^2}{2}}, R, 0, \pi, 0, \frac{Z}{2}\right), \left(\sqrt{\frac{R^2}{2}}, R, 0, \pi, \frac{Z}{2}, Z\right),$$

$$\left(\sqrt{\frac{R^2}{2}}, R, \pi, 2\pi, 0, \frac{Z}{2}\right), \text{ and } \left(\sqrt{\frac{R^2}{2}}, R, \pi, 2\pi, \frac{Z}{2}, Z\right).$$

(C) in a similar fashion, space bounding boxes for all of the (i−1)th-level nodes may be continued to be partitioned to obtain all the ith-level nodes. Assuming that a space bounding box for a certain (i−1)th-level node is expressed as ($r_1$, $r_2$, $\theta_1$, $\theta_2$, $z_1$, $z_2$), then space bounding boxes for 8 ith-level nodes obtained after partitioning of this node may be expressed as follows:

$$\left(r_1, \sqrt{\frac{r_1^2+r_2^2}{2}}, \theta_1, \frac{\theta_1+\theta_2}{2}, z_1, \frac{z_1+z_2}{2}\right),$$

$$\left(r_1, \sqrt{\frac{r_1^2+r_2^2}{2}}, \theta_1, \frac{\theta_1+\theta_2}{2}, \frac{z_1+z_2}{2}, z_2\right),$$

$$\left(r_1, \sqrt{\frac{r_1^2+r_2^2}{2}}, \frac{\theta_1+\theta_2}{2}, \theta_2, z_1, \frac{z_1+z_2}{2}\right),$$

$$\left(r_1, \sqrt{\frac{r_1^2+r_2^2}{2}}, \frac{\theta_1+\theta_2}{2}, \theta_2, \frac{z_1+z_2}{2}, z_2\right),$$

$$\left(\sqrt{\frac{r_1^2+r_2^2}{2}}, r_2, \theta_1, \frac{\theta_1+\theta_2}{2}, z_1, \frac{z_1+z_2}{2}\right),$$

$$\left(\sqrt{\frac{r_1^2+r_2^2}{2}}, r_2, \theta_1, \frac{\theta_1+\theta_2}{2}, \frac{z_1+z_2}{2}, z_2\right),$$

$$\left(\sqrt{\frac{r_1^2+r_2^2}{2}}, r_2, \frac{\theta_1+\theta_2}{2}, \theta_2, z_1, \frac{z_1+z_2}{2}\right), \text{ and}$$

$$\left(\sqrt{\frac{r_1^2+r_2^2}{2}}, r_2, \frac{\theta_1+\theta_2}{2}, \theta_2, \frac{z_1+z_2}{2}, z_2\right).$$

(D) During each partitioning, the processor may try to perform the next partitioning based on the current partitioning. If the number of voxels in node space bounding boxes resulting from the next partitioning is zero, there is no need to continue the partitioning, and leaf node space bounding boxes resulting from the current partitioning may be retained.

After partitioning, each of the leaf node space bounding boxes may include at least one voxel, and the processor may compress the number of voxels at this point.

In an example, the rotary stereoscopic display device may be provided with a predetermined range. The processor may randomly remove some of the voxels in each leaf node space bounding box according to the predetermined range until the number of the voxels lies within the predetermined range. Upon compression, the processor may determine whether the distribution of the voxels in the 3D display space tends to be uniform, for example, whether a density of the voxels in each leaf node space bounding box is maintained within a density range, and may stop compression when the distribution of the voxels in the 3D display space tends to be uniform.

Figure 5:
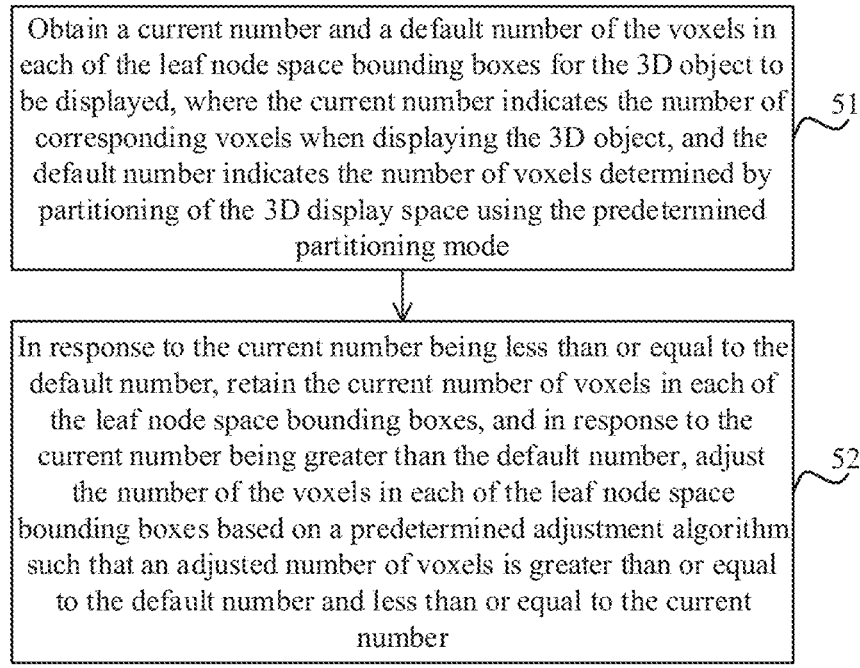
FIG. 5 is a flowchart illustrating adjustment of the number of voxels according to an exemplary embodiment.

In practice, when the number of the voxels in each leaf node space bounding box (which is, for example, in) is strictly the same, the distribution of the voxels may be made more uniform. During the display process, in voxels may be used for displaying images close to the rotating shaft, and when m voxels are also used for displaying images far from the rotating shaft, details corresponding to each voxel increase relatively. In other words, due to limited details displayed by the voxels at the pixels, a large amount of contour details may be lost when they are far from the rotating shaft, resulting in a poor display effect. In another example, the processor may adjust the number of the voxels in each leaf node space bounding box. Referring to FIG. 5, at step 51, a current number and a default number of the voxels in each of the leaf node space bounding boxes may be obtained for a 3D object to be displayed, where the current number indicates the number of corresponding voxels when displaying the 3D object (i.e., an actual number of the voxels in each of the leaf node space bounding boxes), and the default number indicates the number of voxels determined by partitioning of the 3D display space using the predetermined partitioning mode (for example, the number of voxels retained in each of the leaf node space bounding boxes when the distribution of the voxels tends to be uniform after the compression). At step 52, in response to the current number being less than or equal to the default number, the current number of voxels in each of the leaf node space bounding boxes may be retained, and in response to the current number being greater than the default number, the number of the voxels in each of the leaf node space bounding boxes may be adjusted based on a predetermined adjustment algorithm such that an adjusted number of voxels is greater than or equal to the default number and less than or equal to the current number.

Figure 6:
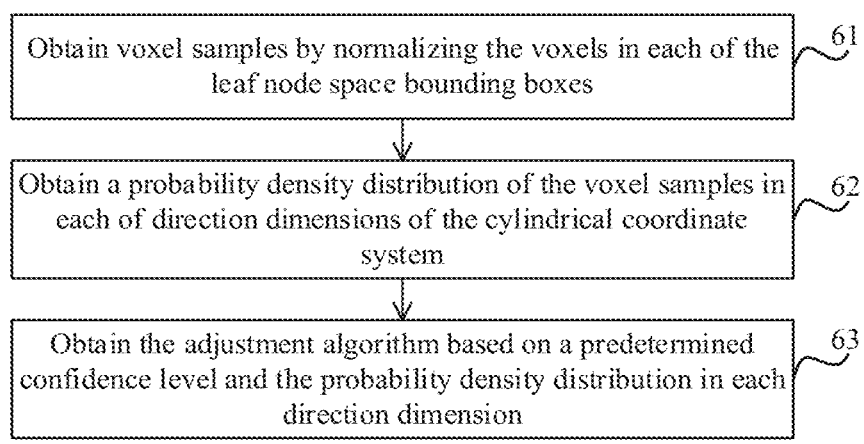
FIG. 6 is a flowchart illustrating obtaining of an adjustment algorithm according to an exemplary embodiment.

Referring to FIG. 6, the above adjustment algorithm may be obtained by the following steps 61 to 63.

At step 61, the processor may obtain voxel samples by normalizing the voxels in each of the leaf node space bounding boxes.

The processor may calculate a mean value of voxel data in each of the three direction dimensions of r, θ, z:

$$(r_{mean}, \theta_{mean}, z_{mean}) = \left( \frac{1}{N}\sum_{i=0}^{N} r_i, \frac{1}{N}\sum_{i=0}^{N} \theta_i, \frac{1}{N}\sum_{i=0}^{N} z_i \right).$$

The processor may subtract the mean data from the voxel data:

$$(\Delta r_i, \Delta \theta_i, \Delta z_i) = (r_i - r_{mean}, \theta_i - \theta_{mean}, z_i - z_{mean}).$$

The processor may calculate a second order matrix of the voxel data, i.e., a variance:

$$(M_r, M_\theta, M_z) = \left( \sqrt{\frac{1}{N}\sum_{i=0}^{N} \Delta r_i^2}, \sqrt{\frac{1}{N}\sum_{i=0}^{N} \Delta \theta_i^2}, \sqrt{\frac{1}{N}\sum_{i=0}^{N} \Delta z_i^2} \right).$$

The processor may normalize the second order matrix:

$$(r'_i, \theta'_i, z'_i) = \left( \frac{\Delta r_i}{M_r}, \frac{\Delta \theta_i}{M_\theta}, \frac{\Delta z_i}{M_z} \right).$$

At step 62, the processor may obtain a probability density distribution of the voxel samples in each of the direction dimensions of the cylindrical coordinate system.

Figure 7:
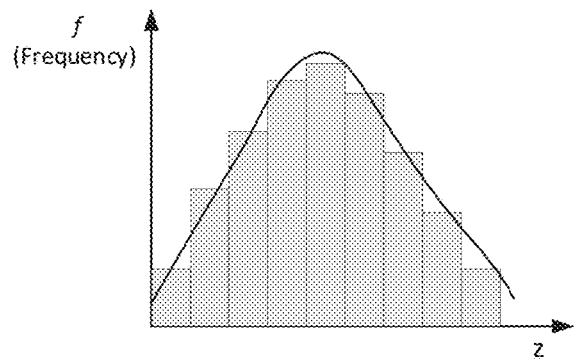
FIG. 7 is a statistical histogram illustrating the number of voxels in Z-direction according to an exemplary embodiment.

The 3D display space may be divided into a plurality of intervals by using a leaf node space bounding box as a partitioning threshold in the three direction dimensions of r, θ, z, respectively. Then, statistical histograms may be obtained by counting the number of voxel samples $(r'_i, \theta'_i, z'_i)$ in different intervals. Taking the Z-direction dimension as an example, the number of voxels included in each leaf node is counted, and a statistical result is shown in FIG. 7.

The processor may build a target polynomial $f(z) = \alpha_0 + \alpha_1 x + \alpha_2 x^2 + \ldots$, with the highest order determined by the number of data points $(x_i, f(z_i))$. Then, the statistical histogram shown in FIG. 7 may be fitted using a least square method to obtain a target polynomial in the Z-direction dimension. For example, the data points $(x_i, f(z_i))$ are substituted into the target polynomial, which is expressed in matrix form as:

$$\begin{bmatrix} 1 & x_1 & x_1^2 & \cdots \\ 1 & x_2 & x_2^2 & \cdots \\ 1 & x_3 & x_3^2 & \cdots \\ \vdots & \vdots & \vdots & \vdots \end{bmatrix} \begin{bmatrix} a_0 \\ a_1 \\ a_2 \\ \vdots \end{bmatrix} = \begin{bmatrix} f(z_0) \\ f(z_1) \\ f(z_2) \\ \vdots \end{bmatrix}, \text{ abbreviated as } XA = F.$$

The matrix $X^T X$ has a unique solution $A = (X^T X)^{-1} X^T F$ when it is non-singular, i.e., the vector A may uniquely determine the target polynomial f(z) in the Z-direction. Similarly, analogous to the above steps, the processor may uniquely determine a target polynomial f(r) in the r-direction and a target polynomial f(θ) in the θ-direction.

f(r), f(θ), f(z) characterize an overall distribution of the number of voxels included with the leaf node space bounding box as the smallest unit, i.e., the probability density distribution.

At step 63, the processor may obtain the adjustment algorithm based on a predetermined confidence level and the probability density distribution in each direction dimension.

For a target object to be displayed (e.g., its 3D model), an octree partitioning may be performed on the 3D display space based on the cylindrical coordinate system to obtain a plurality of leaf node space bounding boxes, and the current number v of voxels in each leaf node space bounding box is counted, with the maximum number of voxels recorded as $v_{max}$, and the minimum number of voxels recorded as $v_{min}$ (except for the space bounding box where the number of voxels is 0). After the compression, the distribution of the voxels tends to be uniform, i.e., the default number of voxels retained in each leaf node space bounding box is $v_{tree}$ ($v_{min} < v_{tree} < v_{max}$). If the current number v of voxels in a space bounding box is less than or equal to $v_{tree}$, all of the v voxels may be retained; and if the current number v of voxels is greater than $v_{tree}$, the processor may perform further processing. On the one hand, the processor may make adjustments with the target polynomials f(r), f(θ), f(z) as references to preserve model details; and on the other hand, the processor may introduce a confidence level $$Con(r) = \frac{r}{R}$$

for adjustment in the r-direction dimension.

For the confidence level Con(r), the following two cases are included.

(i) The smaller the r, the closer a space bounding box is to the rotating shaft, and the more voxels the space bounding box includes. Therefore, a smaller confidence level is introduced at this point, $\lim_{r \to 0} Con(r) = 0$.

(ii) The larger the r, the farther a space bounding box is from the rotating shaft. If there are a large number of voxels included in the space bounding box, it means that model details are included here with a higher retention value. Therefore, a larger confidence level is introduced at this point, $\lim_{r \to R} Con(r) = 1$.

Therefore, for a space bounding box with $v > v_{tree}$, a final number of voxels may be at least $v_{tree}$ and at most v. Therefore, the adjustment algorithm may be obtained based on the confidence level and the probability density distribution as follows:

$$v' = v_{tree} + (\alpha f(r) + \beta f(\theta) + \gamma f(z)) \cdot Con(r) \cdot (v - v_{tree}).$$

where, $v_{tree}$ denotes the default number, v denotes the current number, f(r) denotes the probability density distribution in the radius direction, f(θ) denotes the probability density distribution in the direction of rotation, and f(z) denotes the probability density distribution in the direction of the rotating shaft, α, β and γ denote weights of f(r), f(θ) and f(z), respectively, and a sum of α, β and γ is 1, and Con(r) denotes the confidence level, $\lim_{r \to 0} Con(r) = 0$ and $\lim_{r \to R} Con(r) = 1$.

At step 32, a cross-sectional profile of the 3D object to be displayed on the display screen is determined at each of the phase positions.

Figure 8:
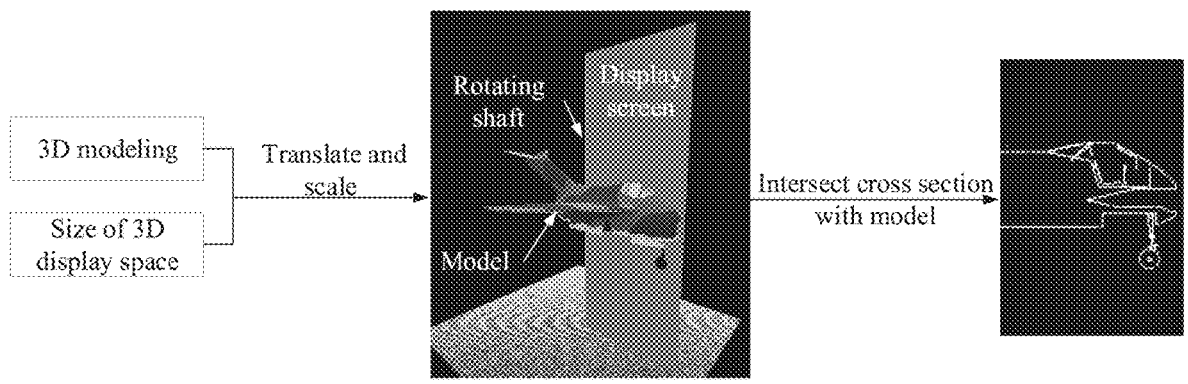
FIG. 8 is a schematic diagram illustrating a cross-sectional image according to an exemplary embodiment.

In this embodiment, referring to FIG. 8, the processor may use software such as 3DMax to model the target object to be displayed to obtain a 3D model of the target object, and translate and scale the 3D model of the target object with reference to an actual size of the 3D display space of the rotary stereoscopic display device. Then, the processor may intersect a cross section at each phase position with the 3D model one by one to obtain the cross-sectional profile of the 3D model at each phase position, as shown on the right in FIG. 8.

At step 33, a cross-sectional image is determined based on voxels and the cross-sectional profile at each of the phase positions.

In this embodiment, the processor may determine the cross-sectional image based on the voxels and the cross-sectional profile at each phase position in the 3D display space.

At step 34, a display image sequence is acquired by arranging the cross-sectional images according to rotation angles of the display screen.

In this embodiment, by using non-uniform partitioning in the radius direction based on the cylindrical coordinate system to obtain space bounding boxes with the same volume, the partitioned space bounding boxes may match the cylindrical 3D display space better, and the distribution of voxels may be more uniform accordingly, which is conducive to improving the display effect.

Figure 9:
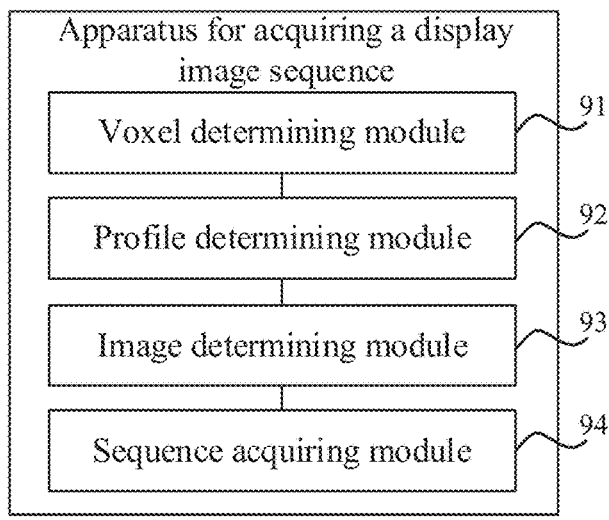
FIG. 9 is a block diagram illustrating an apparatus for acquiring a display image sequence according to an exemplary embodiment.

Embodiments of the present disclosure further provide an apparatus for acquiring a display image sequence, which is applicable to a rotary stereoscopic display device. The rotary stereoscopic display device includes a display screen and a rotating shaft around which the display screen rotates to form a 3D display space, and the display screen has a plurality of phase positions for display in the 3D display space, Referring to FIG. 9, the apparatus includes a voxel determining module 91, a profile determining module 92, an image determining module 93 and a sequence acquiring module 94.

The voxel determining module 91 is configured to determine voxels in the 3D display space by multiple partitioning of the 3D display space in a cylindrical coordinate system using a predetermined partitioning mode, where the predetermined partitioning mode includes non-uniform partitioning in a radius direction of the cylindrical coordinate system, and space bounding boxes resulting from a same partitioning have a same volume, and a voxel indicates an actual spatial position of a pixel of the display screen at each of the phase positions.

The profile determining module 92 is configured to determine a cross-sectional profile of a 3D object to be displayed on the display screen at each of the phase positions.

The image determining module 93 is configured to determine a cross-sectional image based on voxels and the cross-sectional profile at each of the phase positions.

The sequence acquiring module 94 is configured to acquire a display image sequence by arranging the cross-sectional images according to rotation angles of the display screen.

In an embodiment, the predetermined partitioning mode may further include uniform partitioning in a direction of the rotating shaft and a direction of rotation of the cylindrical coordinate system.

In an embodiment, the voxel determining module may include:
a bounding box acquiring unit configured to perform an octree partitioning on the 3D display space using the predetermined partitioning mode, and obtain leaf node space bounding boxes resulting from a current partitioning when the number of voxels in leaf node space bounding boxes resulting from a next partitioning of the current partitioning is zero; and
a voxel number compressing unit configured to compress the number of voxels in each of the leaf node space bounding boxes such that the number of the voxels in each of the leaf node space bounding boxes lies within a predetermined range to obtain the voxels in the 3D display space.

In an embodiment, the apparatus may further include:
a number obtaining module configured to obtain a current number and a default number of the voxels in each of the leaf node space bounding boxes for the 3D object to be displayed, where the current number indicates the number of corresponding voxels when displaying the 3D object, and the default number indicates the number of voxels determined by partitioning of the 3D display space using the predetermined partitioning mode; and
a number adjusting module configured to: in response to the current number being less than or equal to the default number, retain the current number of voxels in each of the leaf node space bounding boxes, and in response to the current number being greater than the default number, adjust the number of the voxels in each of the leaf node space bounding boxes based on a predetermined adjustment algorithm such that an adjusted number of voxels is greater than or equal to the default number and less than or equal to the current number.

In an embodiment, the apparatus may further include an adjustment algorithm obtaining module including:
a sample obtaining unit configured to obtain voxel samples by normalizing the voxels in each of the leaf node space bounding boxes;
a distribution obtaining unit configured to obtain a probability density distribution of the voxel samples in each of direction dimensions of the cylindrical coordinate system; and
an algorithm obtaining unit configured to obtain the adjustment algorithm based on a predetermined confidence level and the probability density distribution in each direction dimension.

In an embodiment, the sample obtaining unit may include:
a mean value obtaining subunit configured to obtain a mean value of voxel data of the voxels in each direction dimension;
a difference obtaining subunit configured to obtain difference data of each voxel in each direction dimension by subtracting the mean value of the voxel data of the voxels in each direction dimension from voxel data of each voxel; and
a sample obtaining subunit configured to obtain the voxel samples by calculating and normalizing a second order matrix of the voxel data of each voxel.

In an embodiment, the distribution obtaining unit may include:
an interval obtaining subunit configured to divide the 3D display space into a plurality of intervals by using a leaf node space bounding box as a partitioning threshold in the radius direction, the direction of rotation and the direction of the rotating shaft, respectively;
a histogram obtaining subunit configured to obtain statistical histograms by counting the number of voxel samples in each of the intervals in the radius direction, the direction of rotation and the direction of the rotating shaft, respectively; and
a distribution obtaining subunit configured to obtain a target polynomial in each direction dimension by fitting the statistical histograms using a least square method, and use the target polynomial in each direction dimension as the probability density distribution of the voxel samples in each direction dimension.

In an embodiment, the adjustment algorithm is expressed as:

$$v'=v_{tree}+(\alpha f(r)+\beta f(\theta)+\gamma f(z))\cdot \text{Con}(r)\cdot(v-v_{tree})$$

where, $v_{tree}$ denotes the default number, v denotes the current number, f(r) denotes the probability density distribution in the radius direction, f(θ) denotes the probability density distribution in the direction of rotation, and f(z) denotes the probability density distribution in the direction of the rotating shaft, α, β and γ denote weights of f(r), f(θ) and f(z), respectively, and Con(r) denotes the confidence level, $\lim_{r\to 0}\text{Con}(r)=0$ and $\lim_{r\to R}\text{Con}(r)=1$.

It will be understood that the apparatus according to the embodiments of the present disclosure corresponds to the method described above, the details of which may be referred to those in various embodiments of the method and will not be repeated herein.

Embodiments of the present disclosure further provide a rotary stereoscopic display device, the rotary stereoscopic display device including a display screen and a rotating shaft around which the display screen rotates to form a 3D display space, and the display screen having a plurality of phase positions for display in the 3D display space, the rotary stereoscopic display device further including:
a processor; and
a memory configured to store a computer program executable by the processor,
where the processor is configured to execute the computer program in the memory to perform the method according to any of the above method embodiments.

Embodiments of the present disclosure further provide a non-transitory readable storage medium including an executable computer program, for example, a memory including instructions. The executable computer program is executable by a processor. The executable computer program in the storage medium, when executed by the processor, causes the processor to perform the method according to any of the above method embodiments. The readable storage medium may include ROM, RAM, CD-ROM, magnetic tape, floppy disk, optical data storage device, etc.

The technical solutions provided by embodiments of the present disclosure may include the following beneficial effects.

In the embodiments of the present disclosure, voxels in a 3D display space may be determined by multiple partitioning of the 3D display space in a cylindrical coordinate system using a predetermined partitioning mode, where the predetermined partitioning mode includes non-uniform partitioning in a radius direction of the cylindrical coordinate system, and space bounding boxes resulting from a same partitioning have a same volume; and a cross-sectional profile of a 3D object to be displayed on the display screen is determined at each of phase positions in the 3D display space; then a cross-sectional image is determined based on voxels and the cross-sectional profile at each of the phase positions in the 3D display space; and finally a display image sequence is acquired by arranging the cross-sectional images according to rotation angles of the display screen. In this way, by using non-uniform partitioning in the radius direction based on the cylindrical coordinate system to obtain space bounding boxes with the same volume, the partitioned space bounding boxes may match the cylindrical 3D display space better, and the distribution of voxels tends to be more uniform accordingly, which is conducive to improving the display effect.

Those skilled in the art will easily conceive of other embodiments of the present disclosure after considering the specification and practicing the disclosure disclosed herein. The present disclosure is intended to cover any variations, uses or adaptive changes. These variations, uses or adaptive changes follow the general principles of the present disclosure and include common knowledge or conventional technical means in the art that are not disclosed by the present disclosure. The specification and the embodiments are considered to be exemplary only, and the true scope and spirit of the present disclosure are pointed out by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A method of acquiring a display image sequence, which is applicable to a rotary stereoscopic display device, the rotary stereoscopic display device comprising a display screen and a rotating shaft around which the display screen rotates to form a 3D display space, and the display screen having a plurality of phase positions for display in the 3D display space, the method comprising:
determining voxels in the 3D display space by multiple partitioning of the 3D display space in a cylindrical coordinate system using a predetermined partitioning mode, wherein the predetermined partitioning mode comprises non-uniform partitioning in a radius direction of the cylindrical coordinate system, and space bounding boxes resulting from a same partitioning have a same volume, and a voxel indicates an actual spatial position of a pixel of the display screen at each of the phase positions;
determining a cross-sectional profile of a 3D object to be displayed on the display screen at each of the phase positions;
determining a cross-sectional image based on voxels and the cross-sectional profile at each of the phase positions; and
acquiring a display image sequence by arranging the cross-sectional images according to rotation angles of the display screen.

2. The method according to claim 1, wherein the predetermined partitioning mode further comprises uniform partitioning in a direction of the rotating shaft and a direction of rotation of the cylindrical coordinate system.

3. The method according to claim 1, wherein determining the voxels in the 3D display space by multiple partitioning of the 3D display space in the cylindrical coordinate system using the predetermined partitioning mode comprises:
performing an octree partitioning on the 3D display space using the predetermined partitioning mode, and obtaining leaf node space bounding boxes resulting from a current partitioning when a number of voxels in leaf node space bounding boxes resulting from a next partitioning of the current partitioning is zero; and
compressing a number of voxels in each of the leaf node space bounding boxes such that the number of the voxels in each of the leaf node space bounding boxes lies within a predetermined range to obtain the voxels in the 3D display space.

4. The method according to claim 3, wherein after the multiple partitioning of the 3D display space in the cylindrical coordinate system using the predetermined partitioning mode, the method further comprises:

obtaining a current number and a default number of the voxels in each of the leaf node space bounding boxes for the 3D object to be displayed, wherein the current number indicates a number of corresponding voxels when displaying the 3D object, and the default number indicates a number of voxels determined by partitioning of the 3D display space using the predetermined partitioning mode; and in response to the current number being less than or equal to the default number, retaining the current number of voxels in each of the leaf node space bounding boxes, and in response to the current number being greater than the default number, adjusting the number of the voxels in each of the leaf node space bounding boxes based on a predetermined adjustment algorithm such that an adjusted number of voxels is greater than or equal to the default number and less than or equal to the current number.

5. The method according to claim 4, wherein the adjustment algorithm is obtained by operations comprising:

obtaining voxel samples by normalizing the voxels in each of the leaf node space bounding boxes;

obtaining a probability density distribution of the voxel samples in each of direction dimensions of the cylindrical coordinate system; and obtaining the adjustment algorithm based on a predetermined confidence level and the probability density distribution in each direction dimension.

6. The method according to claim 5, wherein obtaining the voxel samples by normalizing the voxels in each of the leaf node space bounding boxes comprises:

obtaining a mean value of voxel data of the voxels in each direction dimension;

obtaining difference data of each voxel in each direction dimension by subtracting the mean value of the voxel data of the voxels in each direction dimension from voxel data of each voxel; and obtaining the voxel samples by calculating and normalizing a second order matrix of the voxel data of each voxel.

7. The method according to claim 5, wherein obtaining the probability density distribution of the voxel samples in each of direction dimensions of the cylindrical coordinate system comprises:

dividing the 3D display space into a plurality of intervals by using a leaf node space bounding box as a partitioning threshold in the radius direction, a direction of rotation and a direction of the rotating shaft, respectively;

obtaining statistical histograms by counting a number of voxel samples in each of the intervals in the radius direction, the direction of rotation and the direction of the rotating shaft, respectively; and obtaining a target polynomial in each direction dimension by fitting the statistical histograms using a least square method, and using the target polynomial in each direction dimension as the probability density distribution of the voxel samples in each direction dimension.

8. The method according to claim 5, wherein the adjustment algorithm is expressed as:

$$v' = v_{tree} + (\alpha f(r) + \beta f(\theta) + \gamma f(z)) \cdot \text{Con}(r) \cdot (v - v_{tree}),$$

wherein, $v_{tree}$ denotes the default number, v denotes the current number, f(r) denotes the probability density distribution in the radius direction, f(θ) denotes the probability density distribution in a direction of rotation, and f(z) denotes the probability density distribution in a direction of the rotating shaft, α, β and γ denote weights of f(r), f(θ) and f(z), respectively, and Con(r) denotes the confidence level, $\lim_{r \to 0} \text{Con}(r) = 0$ and $\lim_{r \to R} \text{Con}(r) = 1$.

9. A rotary stereoscopic display device, the rotary stereoscopic display device comprising a display screen and a rotating shaft around which the display screen rotates to form a 3D display space, and the display screen having a plurality of phase positions for display in the 3D display space, the rotary stereoscopic display device further comprising:

a processor; and a memory configured to store a computer program executable by the processor, wherein the processor is configured to execute the computer program in the memory to perform operations comprising:

determining voxels in the 3D display space by multiple partitioning of the 3D display space in a cylindrical coordinate system using a predetermined partitioning mode, wherein the predetermined partitioning mode comprises non-uniform partitioning in a radius direction of the cylindrical coordinate system, and space bounding boxes resulting from a same partitioning have a same volume, and a voxel indicates an actual spatial position of a pixel of the display screen at each of the phase positions;

determining a cross-sectional profile of a 3D object to be displayed on the display screen at each of the phase positions;

determining a cross-sectional image based on voxels and the cross-sectional profile at each of the phase positions; and acquiring a display image sequence by arranging the cross-sectional images according to rotation angles of the display screen.

10. The device according to claim 9, wherein the predetermined partitioning mode further comprises uniform partitioning in a direction of the rotating shaft and a direction of rotation of the cylindrical coordinate system.

11. The device according to claim 9, wherein determining the voxels in the 3D display space by multiple partitioning of the 3D display space in the cylindrical coordinate system using the predetermined partitioning mode comprises:

performing an octree partitioning on the 3D display space using the predetermined partitioning mode, and obtaining leaf node space bounding boxes resulting from a current partitioning when a number of voxels in leaf node space bounding boxes resulting from a next partitioning of the current partitioning is zero; and compressing a number of voxels in each of the leaf node space bounding boxes such that the number of the voxels in each of the leaf node space bounding boxes lies within a predetermined range to obtain the voxels in the 3D display space.

12. The device according to claim 11, wherein after the multiple partitioning of the 3D display space in the cylindrical coordinate system using the predetermined partitioning mode, the operations further comprise:

obtaining a current number and a default number of the voxels in each of the leaf node space bounding boxes for the 3D object to be displayed, wherein the current number indicates a number of corresponding voxels when displaying the 3D object, and the default number indicates a number of voxels determined by partitioning of the 3D display space using the predetermined partitioning mode; and in response to the current number being less than or equal to the default number, retaining the current number of voxels in each of the leaf node space bounding boxes, and in response to the current number being greater than the default number, adjusting the number of the voxels in each of the leaf node space bounding boxes based on a predetermined adjustment algorithm such that an adjusted number of voxels is greater than or equal to the default number and less than or equal to the current number.

13. The device according to claim 12, wherein the adjustment algorithm is obtained by operations comprising:
    obtaining voxel samples by normalizing the voxels in each of the leaf node space bounding boxes;
    obtaining a probability density distribution of the voxel samples in each of direction dimensions of the cylindrical coordinate system; and
    obtaining the adjustment algorithm based on a predetermined confidence level and the probability density distribution in each direction dimension.

14. The device according to claim 13, wherein obtaining the voxel samples by normalizing the voxels in each of the leaf node space bounding boxes comprises:
    obtaining a mean value of voxel data of the voxels in each direction dimension;
    obtaining difference data of each voxel in each direction dimension by subtracting the mean value of the voxel data of the voxels in each direction dimension from voxel data of each voxel; and
    obtaining the voxel samples by calculating and normalizing a second order matrix of the voxel data of each voxel.

15. The device according to claim 13, wherein obtaining the probability density distribution of the voxel samples in each of direction dimensions of the cylindrical coordinate system comprises:
    dividing the 3D display space into a plurality of intervals by using a leaf node space bounding box as a partitioning threshold in the radius direction, a direction of rotation and a direction of the rotating shaft, respectively;
    obtaining statistical histograms by counting a number of voxel samples in each of the intervals in the radius direction, the direction of rotation and the direction of the rotating shaft, respectively; and
    obtaining a target polynomial in each direction dimension by fitting the statistical histograms using a least square method, and using the target polynomial in each direction dimension as the probability density distribution of the voxel samples in each direction dimension.

16. The device according to claim 13, wherein the adjustment algorithm is expressed as:

$$v' = v_{tree} + (\alpha f(r) + \beta f(\theta) + \gamma f(z)) \cdot \mathrm{Con}(r) \cdot (v - v_{tree}),$$

wherein, $v_{tree}$ denotes the default number, v denotes the current number, f(r) denotes the probability density distribution in the radius direction, f(θ) denotes the probability density distribution in the direction of rotation, and f(z) denotes the probability density distribution in the direction of the rotating shaft, α, β and γ denote weights of f(r), f(θ) and f(z), respectively, and Con(r) denotes the confidence level, $\lim_{r \to 0} \mathrm{Con}(r) = 0$ and $\lim_{r \to R} \mathrm{Con}(r) = 1$.

17. A computer-readable storage medium comprising an executable computer program, which, when executed by a processor, causes the processor to perform the method according to claim 1.

* * * * *